United States Patent [19]

Lochmiller

[11] Patent Number: 5,062,488
[45] Date of Patent: Nov. 5, 1991

[54] SMALL TERRACE GENERATING MACHINE WITH LATERAL DAMMERS

[76] Inventor: Alan W. Lochmiller, 509 N. Jackson St., Bushnell, Ill. 61422

[21] Appl. No.: 555,926

[22] Filed: Jul. 19, 1990

[51] Int. Cl.$^5$ .......................... A01B 3/28; A01B 13/02; A01B 13/16
[52] U.S. Cl. .......................... 172/1; 172/146; 172/161; 172/177; 172/229
[58] Field of Search ................ 172/61, 143, 145, 146, 172/149, 151, 161, 166, 176, 177, 180, 191, 229, 528–530, 540, 1

[56] References Cited

U.S. PATENT DOCUMENTS

| | | | |
|---|---|---|---|
| 2,229,372 | 1/1941 | Debnam | 172/143 X |
| 2,582,337 | 1/1952 | Kaltoft | 172/229 X |
| 4,131,163 | 12/1978 | Bezzerides | 172/145 |
| 4,213,502 | 7/1980 | Gibson | 172/143 X |
| 4,303,129 | 12/1981 | Mills | 172/530 |
| 4,372,396 | 2/1983 | Westlund | 172/1 |

FOREIGN PATENT DOCUMENTS

| | | | |
|---|---|---|---|
| 71768 | 3/1947 | Norway | 172/146 |
| 136582 | 1/1930 | Switzerland | 172/177 |
| 117026 | 3/1958 | U.S.S.R. | 172/177 |

*Primary Examiner*—Dennis L. Taylor
*Assistant Examiner*—Jeffrey L. Thompson
*Attorney, Agent, or Firm*—Hill, Van Santen, Steadman & Simpson

[57] ABSTRACT

An apparatus is disclosed to perform a method of tilling the soil on a crop field that: will hold rainwater where it falls, increase the percolation rate of this water into the soil, and provide storage room above and below ground level for this water. The tillage method depends on forming a series of small, flat topped terraces with interconnecting lateral dams. These small, flat topped terraces are sized, laterally spaced, and flat topped so that row crops can easily be planted on top of them. The small, flat topped terraces are generated during a deep soil tillage operation. An apparatus is provided to generate these uniformly spaced, flat topped terraces with lateral dams in a four-step process while traveling in either direction across a sloping crop field. Small supplemental tillage means may advantageously be provided for lateral dam generation under adverse soil conditions.

3 Claims, 4 Drawing Sheets

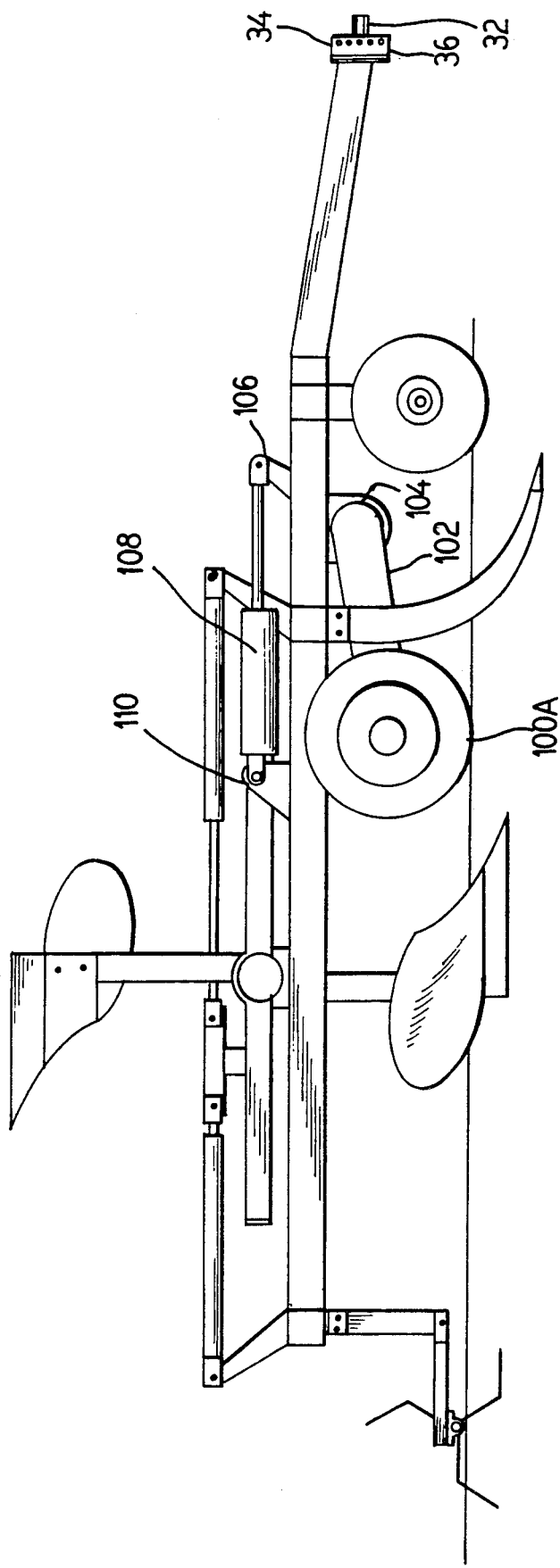

SMALL TERRACE GENERATING MACHINE WITH LATERAL DAMMERS

FIELD OF THE INVENTION

This application pertains to a device and method to till and convert untilled highly erodible farm land into small, parallel, flat topped terraces with closely spaced, lateral dams between these terraces.

BACKGROUND OF THE INVENTION

Farmers from around the world who till and plant row crops on sloping, highly erodible land have been seeking for many years a method of efficiently tilling and planting row crops that will restrict waterborne soil erosion from present high levels. Severe waterborne soil erosion results in the loss of soil, as well as the loss of small corn or soybean plants if the soil erosion occurs in May or June. This erosion can result in a significant loss of crop production.

A problem coincidental with erosion is crop residue loss. Crop residue floats on water so when highly erodible land receives heavy rainfall any unattached crop residue on the surface is free to float away with the rainwater runoff.

This process is demonstrated by checking a flood control dam installed across a gully between hillsides of highly erodible land after a heavy rainfall. If these hillsides were previously planted with a row crop, such as corn, the rainwater runoff collected will be soil laden and a brown color. This rainwater will also have up to a 2-inch thick layer of crop residue floating on the surface. Woven wire fences in the path of the rainwater runoff are also good places to check for crop residue loss. This crop residue loss process lowers the potential organic material content and fertility of the soil in that area.

Soil experts have proven that rain drops pounding on bare soil during rainstorms break up the surface of the soil into very fine particles. These fine particles of soil called silt are carried into every fissure and opening in the surface of the soil and decrease the percolation rate of rainwater into the soil. Tests run by soil scientists indicate that this silting process may reduce the percolation rate of rainwater into the soil by as much as fifty percent. Soil experts use the following guidelines for predicting rainwater percolation rates by area across the midwestern U.S. The percolation rate is about one-half inch per hour if trash is present close to the top or on top of the soil surface in the heavy dark soils of eastern Iowa, Ill., Ind., and Ohio. The percolation rate is about one inch per hour into the lighter soils of western Iowa, Miss., Nebr., and Kans. A system of farming called minimum tillage has developed around the concept of leaving the trash on the soil surface. This system works well on level or slightly sloped land as long as the rainfall rates stay below the percolation rates of rainwater into the soil. When heavy rainfall exceeds the percolation rate of rainwater into the soil or prolonged rainfalls saturate the topsoil, then heavy soil erosion occurs. Rainfall rates up to four and one-fourth inches in twenty minutes have been observed in western Iowa. Tons of topsoil and crop residue left with the runoff rainwater. Probably less than one-half inch of this rainfall actually percolated into the soil. The soil moisture needed to help the farmer raise full crops ran off to the local streams and rivers.

To date the standard answer to limit soil erosion has been to limit slope length to one hundred twenty feet. This is currently done by installing large, parallel terraces across long slopes. The terraces are positioned one hundred twenty feet apart starting near the top of the slope and moving toward the bottom. The height of these terraces depends on local rainfall conditions, and most are sized for two to three inches of rainfall per hour. Lateral dams are also sometimes provided to keep rainwater from running to a low spot above the terrace. Occasionally drainpipe systems are also used to carry excess rainwater to the bottom of the slope. Using this parallel terrace system, waterborne soil eroded during very heavy rainfall is collected on the top side of these terraces. This soil erosion generally limits the life of these terraces to about ten years. After ten years of use most terrace systems will run over during heavy rainfall if the accumulated silt isn't removed. Very heavy rainfalls are often during or followed by long dry periods when excess rainwater that was allowed to runoff is needed to grow the row crop planted on this sloping land. When large terraces are used the accumulated water from the area above the terrace is trapped and allowed to infiltrate into the soil immediately above the terrace and the terrace itself. This excess water and silt in a small area can cover one or two rows in the bottom of the terrace with silt, but four to six rows that are in the reservoir area of the terrace will do very well in a following dry period.

Many farmers have not installed these large terraces on highly erodible land over the years, even with government assistance, due to a number of reasons such as:

1. The large terraces remove acres of productive farm land from use.
2. The large terraces cost thousands of dollars to install and more thousands of dollars to remove the silt in the future.
3. The large terraces decrease the short term economic return from a given field of farm land because the increased yield in the terrace area generally doesn't compensate for the land removed from production.
4. The large terraces make it more expensive to farm the land.
5. The natural independence of the American farmer.

A second rainfall control problem is exhibited by near level land. After prolonged heavy rainfall when the soil becomes saturated the excess rainwater all runs to a low spot in the field and forms a large pond. Sometimes these ponds are many acres in extent. If the water from these ponds percolates into the soil too slowly, then crops planted in these areas die and have to be replanted. A further problem with these ponds is that as excess rainwater from a large area percolates into the soil over a small area it leaches a large part of the soil's nutrients down below the root zone of young row crop plants. In this situation the farmer usually has to refertilize as well as replant this area to get a full crop.

The object of this invention is to reduce the foregoing problems of erosion by holding all the rainfall on a field where it falls.

These and other objects of this invention will become apparent from the following disclosure and appended claims.

SUMMARY OF THE INVENTION

To accomplish the foregoing object a Small Terrace Generating Machine With Lateral Dammers is provided. This apparatus produces a series of small, flat topped, parallel terraces with lateral dams in the soil as it is towed across the crop field in the lowered, operating position. At the end of the field the apparatus is raised, the lateral special moldboard plow is pivoted, and the apparatus is again lowered to make the return trip across the field generating small terraces and lateral dams.

BRIEF DESCRIPTION OF THE DRAWINGS

In the drawings, clearly related figures have the same number but different alphabetic suffixes.

FIG. 7 is a right side elevation of the apparatus of FIG. 6;

DESCRIPTION OF THE PREFERRED EMBODIMENT

A. The System in General

FIGS. 1-5 show the result of work done on the soil as each line of tillage tool passes through a cross-sectional plane on a sloped field.

Figure 1:
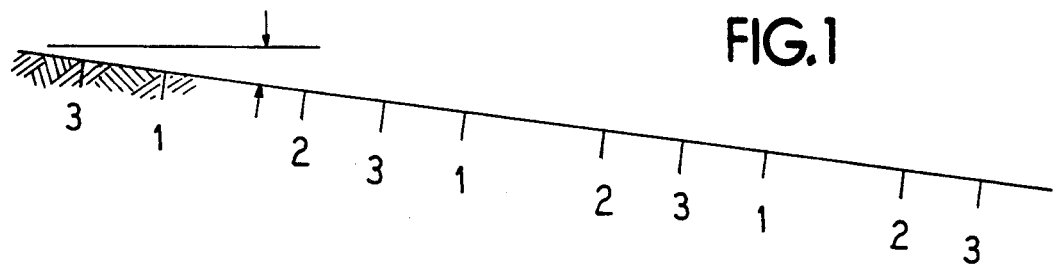
FIGS. 1-5 are diagrammatic and sectional representations of a sequence of steps for plowing a field according to the is invention.

FIG. 1 shows the cuts in the soil made as a set of coulters (i.e., soil cutters) pass the plane. The cuts made by the coulters are respectively numbered 1, 2, 3. The cuts numbered 3 cut the crop residue and the soil centered in front of the trailing ripper plows. The cuts numbered 1, 2, cut the crop residue and soil ahead of and closely flanked along each side of a trailing special moldboard plow.

Figure 2:
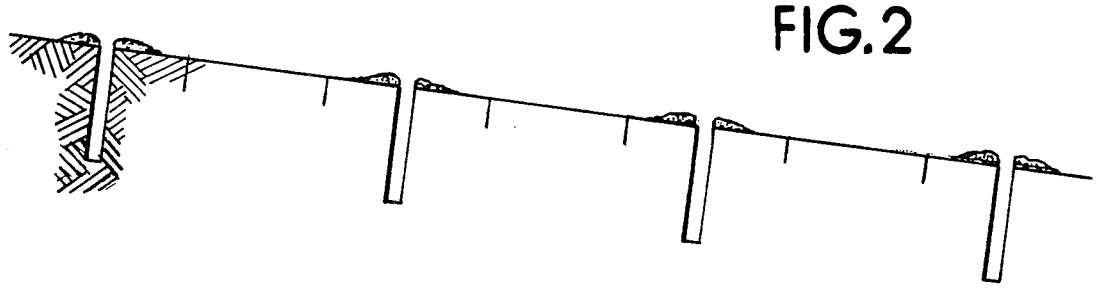

FIG. 2 shows the cuts numbered 1, 2, and the narrow, open trenches made by the ripper plows.

Figure 3:
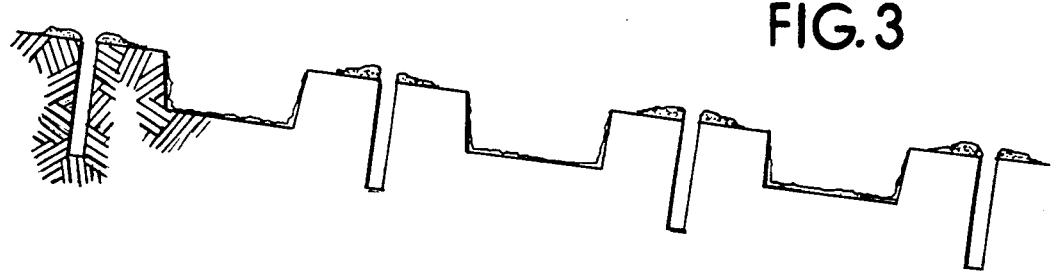

FIG. 3 shows the trenches made by the ripper plows and the furrows cut out by the special moldboard plows and the trenches are about 12 inches deep (D).

Figure 4:
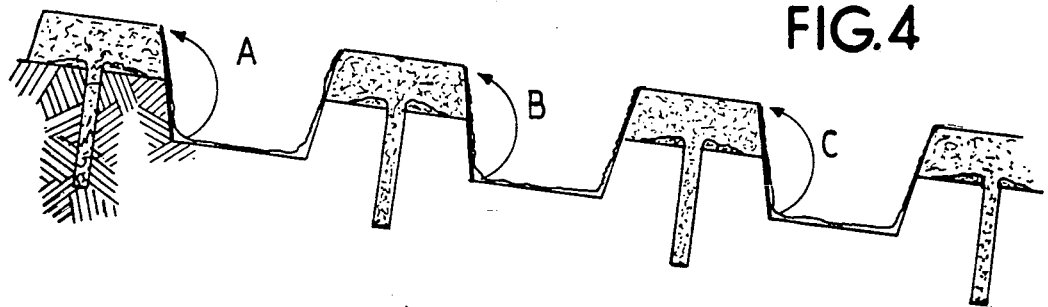

FIG. 4 shows the trenches made by the ripper plows, the furrows cut out by the special moldboard plows, and the soil ribbons produced by the special moldboard plows. The soil ribbons are cut out, lifted, rotated 180 degrees, and deposited upside down centered on top of the narrow open trenches made by the ripper plows. The arrows such as A, B and C show the initial and final position of a corner of the soil ribbon. This operation completes the generation of the small, flat topped terraces. Some loose soil is shown along the bottom and sides of the furrow.

Figure 5:
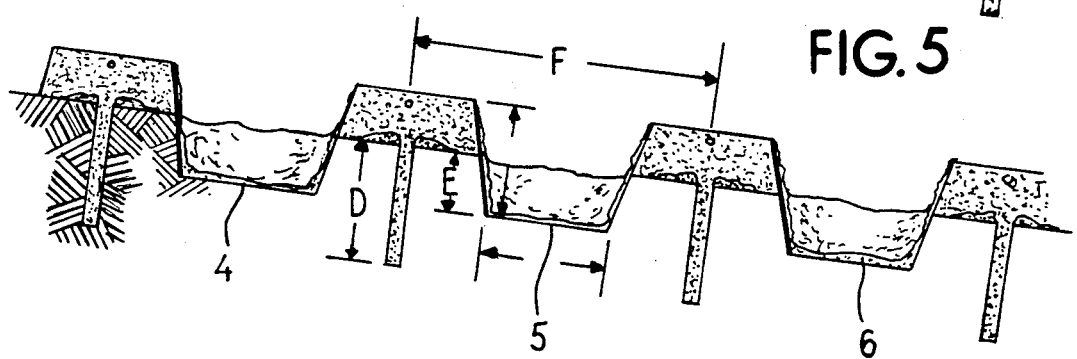

FIG. 5 shows that a line of lateral dams 4, 5 and 6 formed by loose soil left in the furrows to generate lateral dams about 8 inches high (E) and 30 inches (F) apart along in the furrow between the small, flat topped terraces. The flat topped terraces are about 12 inches high and 30 inches apart from center to center. Seeds are shown planted in 30-inch rows, although other sized terraces and row widths could be used.

The small terraces are made flat topped so that it is easier to plant a row of corn or soybeans on top of them.

If the Small Terrace Generating Machine With Lateral Dammers is used in the spring planting season, then row crop planter units are attached to a cross frame in between lateral dammers. These planter units plant row crops on top of the small, flat topped terraces. If this apparatus is used in the fall, then it is used as a tillage tool only. Many farmers till their fields in the fall because the effects of frost and moisture help to break up the slabs formed when heavy or dry soils are tilled. Fall tillage lets moisture and air penetrate into the soil as well as burying crop residue from the previous growing season. When this terracing tillage operation is done in the fall organic matter such as corn leaves and stalks are trapped from blowing or washing off of the field. Another advantage of fall tillage with this apparatus is that most of the rain and snow fall during the winter is held on the field where it falls. When other types of fall tillage or no tillage is used, a high percentage of the moisture received during the time the soil is frozen blows or runs off the field before the soil thaws out.

While other types of fall tillage equipment often have wind erosion problems, using this terracing tillage system wind-borne soil erosion is significantly reduced because of the labyrinth seal effect the small, flat topped terraces and lateral dams have on high velocity surface winds. When farmers use the Small Terrace Generating Machine With Lateral Dammers increased soil moisture is available to planted crops during dry period, water-borne soil erosion is decreased, and wind-borne soil erosion is reduced.

Agricultural experts say that it takes a minimum of approximately nineteen inches of rainfall without runoff to grow a full corn or soybean crop. They also say that approximately one-third of the rainfall received on highly erodible land is lost due to runoff. Therefore, nearly thirty inches of rainfall may be required to raise a full corn or soybean crop instead of the nineteen inches that should be required. The increased probability of full crops gives the farm operator a strong, short term, economic reason to install this small terrace with lateral dam tillage system on his farm if he has highly erodible land, water or wind-borne soil erosion problems, or rainwater ponding problems on near level land.

B. Small Terrace Generating Machine With Lateral Dammers in General

The apparatus includes a pull-type frame with a forward line of coulters to cut through the ground and crop residue from the previous crop year. Three coulters are required to generate each small terrace. One coulter cuts the trash and soil for a ripper plow shank. The second and third coulters cut the trash and ground for the edges of a moldboard plow furrow. Ripper plows are individually aligned behind every third coulter. These ripper plows extend approximately twelve inches deep. The ripper plow shanks serve to shatter the soil above and out above forty-five degrees from each side of the ripper plow and leave narrow open trenches in the soil. There is one ripper plow for each small terrace. Each riper plow is aligned in the center of the small, flat topped terrace that is to be generated. A line of special moldboard plows follow behind and are centered between the ripper plow shanks. These moldboard plows are called special because the moldboards on these bottoms are designed to do a different job than previous moldboard plows. The special moldboard plow generates the small, flat topped terrace by making a furrow in the soil half the height of the small, flat topped terrace, and deposits that soil on top of the ripper plowed soil. This operation completes the small, flat topped terrace. A line of dammers follow behind the special moldboard plow bottoms. The dammers are centered on, and run in the furrow of the special moldboard plow bottoms. The dammers generate lateral dams about six inches high and thirty inches apart from loose soil left in the furrow. If soil conditions are such that insufficient soil remains in the furrow to generate the lateral dams, then a small cultivator shank is mounted to the lower end of the shank used to pull the dammer. These dammers are adjusted to loosen sufficient soil from the furrow bottom for lateral dam generation. A rear hitch can be attached to the rear of the frame for towing additional equipment.

In the past moldboard plows have been designed to cut out a furrow in the soil, then lift and rotate the soil ribbon produced approximately 110 degrees to leave the soil ribbon from the furrow standing on edge but leaning against the soil ribbon from a previous pass by a moldboard plow. The special moldboard plows cut out, lift, and rotate the soil ribbon 180 degrees to leave the soil ribbon turned completely upside down. These special moldboard plows are set up in a lateral, pivotable, special moldboard plow configuration. This lateral, pivotable, special moldboard plow configuration has a center lateral draft beam with one right-hand special moldboard plow assembly and one lefthand special moldboard plow assembly for each small, flat topped terrace generated. The right-hand and left-hand special moldboard plow assemblies are mounted on opposite sides of the draft beam. The right-hand and left-hand special moldboard plow assemblies are aligned center-to-center to cut out a furrow in the same position and direction of travel, but laterally shift the soil ribbon produced in opposite directions. The draft beam is rotated about 180 degrees to present all right-hand special moldboard plows, or all left-hand special moldboard plows to the soil on successive passes across the field. The lateral, pivotable, special moldboard plow configuration is used so that the special moldboard plowed soil is turned up slope on successive passes across the field. The special moldboard plows are set to operate at approximately one-half the height of the finished terrace. The special moldboard plow is positioned to take the soil from the furrow, and turn it upside down, and deposit it centered on the ripper plow trench. The size of the special moldboard plows required for a given application varies in width depending on the center-to-center distance and height of the terraces to be generated.

During the first crop year of use the Small Terrace Generating Machine with Lateral Dammers causes the crop residue to be placed in a horizontal layer inside of and half the height of the small, flat topped terrace. During the second and subsequent crop years of use the crop residue is placed in a horizontal layer inside of and at the base of the small, flat topped terrace. This crop residue layer bridges and prevents soil from falling into the trench cut by the ripper plow. The horizontal crop residue layer also greatly increases infiltration of rainwater by acting as a wick to carry water into the narrow trench for underground water storage. The total water storage capacity of these small, flat topped terraces with above ground and below ground storage is rated to be in excess of 4.0 inches of rainfall without percolation of rainwater into the soil. This tillage method combines underground air from the trench, stored moisture, and all of the crop residue in a layer to form an efficient compost generator. If sufficient nutrients are available in or added to the soil and crop residue, then the compost generated will support top crop yields.

C. The Apparatus Specifically

Referring to FIGS. 6-11, reference numeral 10, generally designates a bridge-type main frame including a right frame member 12, a center frame member 14, and a left frame member 16, which are aligned in parallel and welded at their forward ends to the rear ends of their respective tongue frame members including a right tongue 18, a center tongue member 20, and a left tongue member 22. The three frame members 12, 14, 16, are welded at their respective rear ends to a fourth cross frame 24. The three tongue frame members 18, 20, 22, are joined near their midpoint by a right tongue brace 26, and a left tongue brace 28, and at their forward end by an adjustable height hitch frame 30. A clevis 32, which provides a hitch point 34, adapted to be connected to a traction vehicle for pulling the apparatus.

As seen in FIG. 7, the adjustable height hitch frame 30, with multiple vertically set apertures 36, permits vertical adjustment of the hitch point 34.

Figure 6:
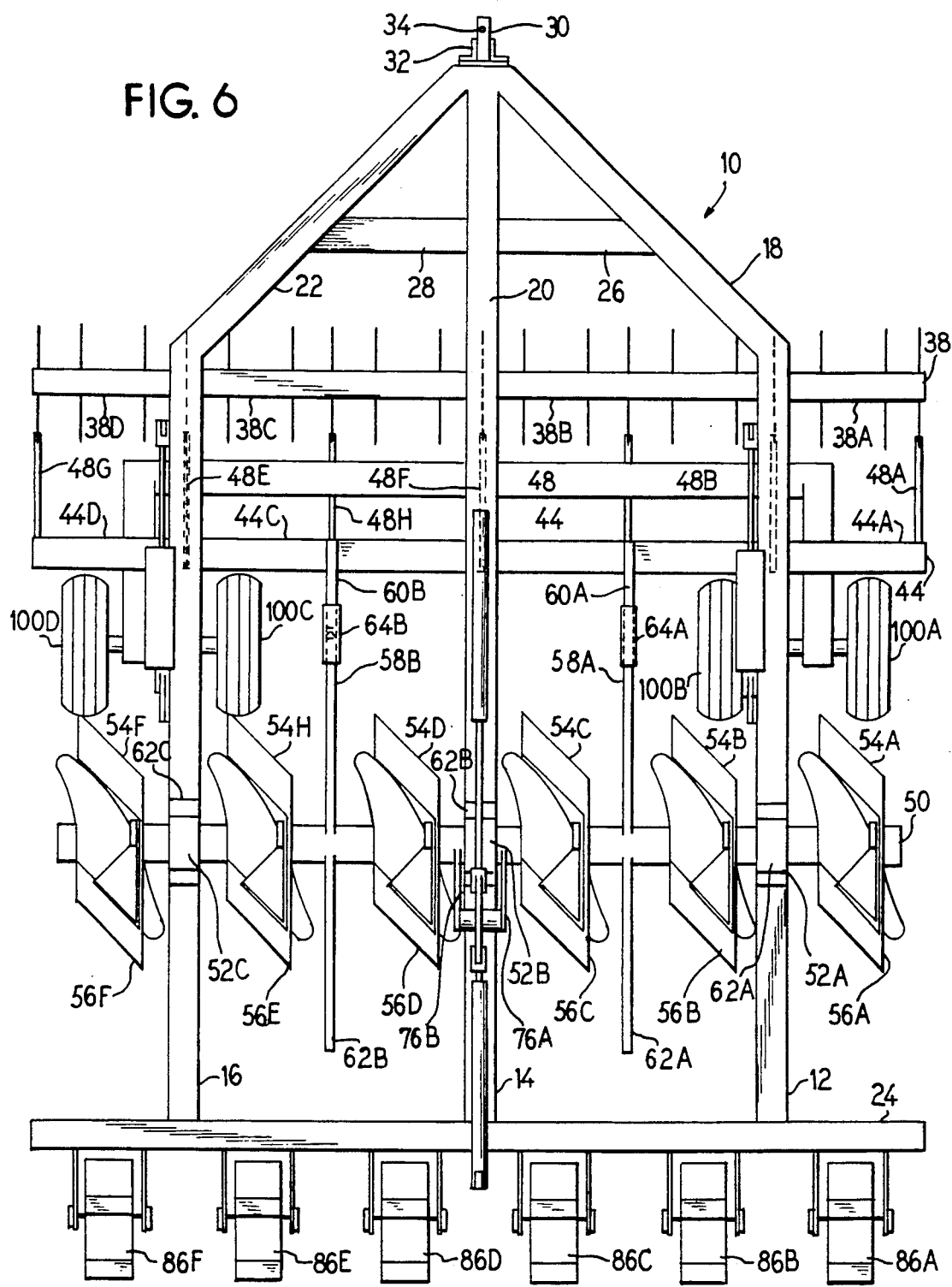
FIG. 6 is a plan view of the apparatus according to the present invention.
Figure 8:
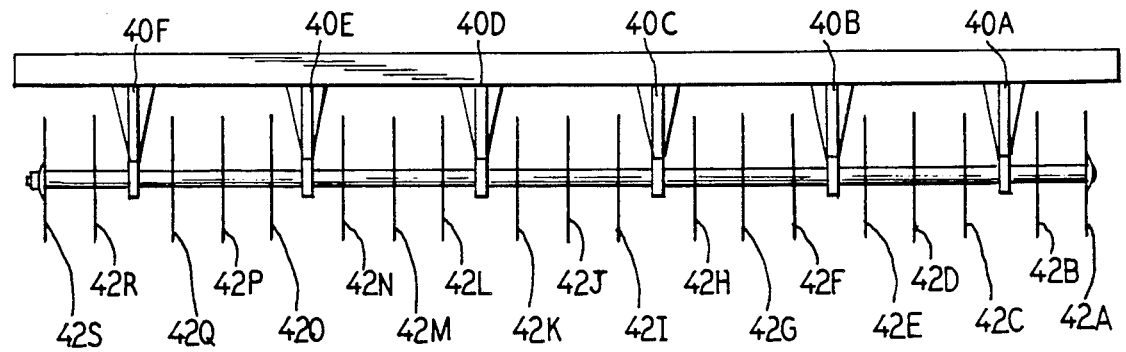
FIG. 8 is a front view of the forward line of a coulter apparatus of FIG. 6.

From FIG. 6, a first cross frame 38 is a four-part cross frame 38A, 38B, 38C and 38D that is welded onto and between the three frame members 12, 16, 18, to form the cross frame support for a set of six coulter support frames 40A, 40B, 40C, 40D, 40E and 40F as seen in FIG. 8. A first line of nineteen coulters 42A-42S, are rotationally attached to the six coulter support frames 40A-40F.

A second cross frame 44, is a four-part frame 44A-44D that is welded onto and between the three frame members 12, 14, 16, to form the cross frame support for a set of seven ripper plow attachment frames 46A-46G. A line of seven ripper plows 48A-48G are bolted to the seven ripper plow attachment frames 46A-46G.

A third cross frame 50, is a one-part rock shaft frame that extends laterally across the width of the apparatus. A set of three sleeve bearings 52A-52C, are used to attach said third cross frame 50 to the top side of frame members 12, 14 and 16. The third cross frame 50 has six right-hand special moldboard plow assemblies 54A-54F attached widely spaced in parallel along the bottom side, and pivoted 180 degrees, six left-hand special moldboard plow assemblies 56A-56F, attached widely spaced in parallel along the top side. The third cross frame 50 has a right pivoting lock beam 58A, and a left pivot lock beam 58B, widely spaced and parallel to the front side to couple respectively with a right pivot lock arm 60A and left pivot lock arm 60B to lock the right-hand special moldboard plow set in proper plowing position, and a right pivot lock beam and left pivot lock beam widely spaced and parallel on the back side to couple respectively with said right pivot lock arm 60A and left pivot lock arm 60B to lock the left-hand special moldboard plow set in proper plowing position.

From FIG. 6, the right pivoting lock beam 58A and right pivoting lock beam are alternately locked to a pivot lock arm 60A by a right pivot lock sleeve 64A. The pivot lock sleeve 64A is pivotally connected to one end of a right transfer link 66A, and the right transfer link is pivotally connected at the other end to one end of a right transfer lever 68A. The right transfer lever 68A is pivotally connected at the other end to a right rocker link 70A, and the other end of the right rocker arm link 70A is pivotally connected to a right rocker arm 72A. The right rocker arm 72A is welded to the lift rock shaft assembly 74. The left pivoting lock beam 58B and the left pivoting lock beam are alternately locked to a pivot lock arm 60B by a left pivot lock sleeve 64B. The left pivot lock arm 60B is pivotally connected to one end of a left transfer link, and the left transfer link is pivotally connected at the other end to a left transfer lever. The left transfer lever is pivotally connected at the other end to a left rocker link, and the other end of the left rocker link is pivotally connected to a left rocker arm. The left rocker arm is welded to the lift rock shaft assembly. The right and left systems are identical. Using these systems the plows on the third cross member are held in position against rotation. Rotation for pivoting of the moldboards and cross member 50 is controlled by the following mechanism.

Figure 11:
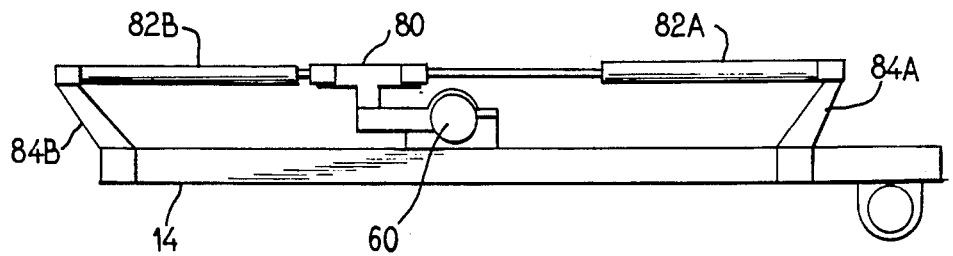
FIG. 11 is a right-side view of the pivoting apparatus for the third pivoting cross frame of FIG. 6.
Figure 10:
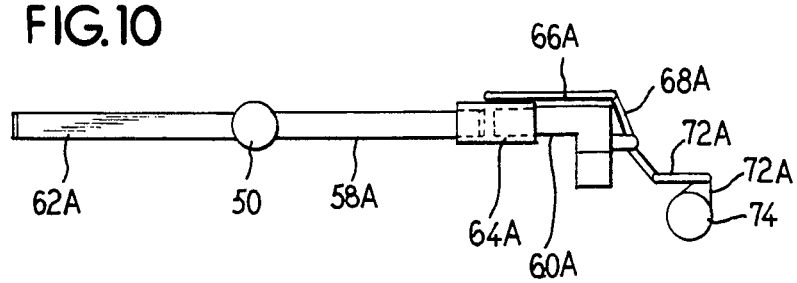
FIG. 10 is a right side view of the third pivoting cross frame lock apparatus of FIG. 6.
Figure 9:
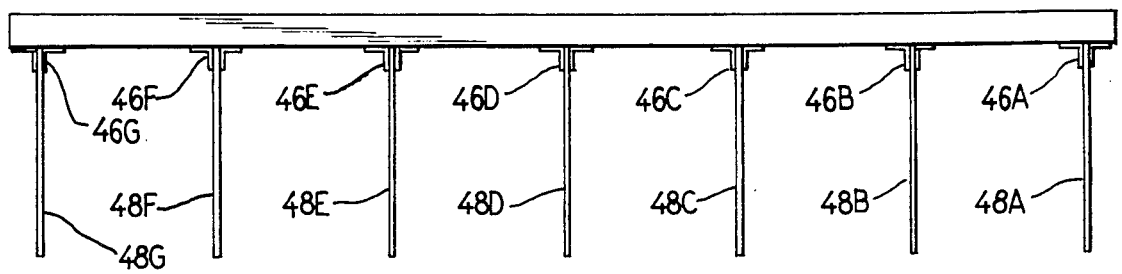
FIG. 9 is a front view of the second line of ripper plow apparatus of FIG. 6.

From FIGS. 6 and 11, the third cross frame 50 has a right rocker arm 76A and a left rocker arm 76B attached closely spaced in parallel on opposite sides of center sleeve bearing 52B. Positioned between and pivotally fastened to the two rocker arms 76A and 76B is a pivoting link actuator 80. A front hydraulic power cylinder 82A is pivotally attached to the front end of said pivoting powerlink actuator 80. The front hydraulic power cylinder 82A is pivotally attached at the front end to a front hydraulic power fixed mount 84A. To the rear end of the roll over link actuator 80 is pivotally attached a hydraulic power cylinder 82B, which is pivotally attached at the rear end to a rear hydraulic power fixed mount 84B.

The fourth cross frame 24 is a support frame for a set of six lateral dam generators 86A-86F. The fourth cross frame 24 is sized to support additional equipment such as minimum tillage row-crop planter units located between the lateral dammer units and aligned center-to-center rearwardly of the ripper plows. A trailing equipment hitch can be attached as supplemental equipment to the rear center of cross frame 24.

A set of wheels 100A-100D are provided to support the entire frame system, which is adjustable with respect to the ground via the link 102, cross arm 104, link 106, hydraulic piston 108, and mount 110 that is secured to the frame 10.

D. Operation

The operation of the apparatus will accomplish the terracing set forth above. The specific operation is believed to be evident to one skilled in the art.

Having thus disclosed in detail a preferred embodiment of the invention, persons skilled in the art will be able to modify certain of the structure which has been illustrated and substitute equivalent elements for those disclosed while continuing to practice the principle of the invention. The above description shall not be construed as limiting the ways in which this invention may be practiced, but shall be inclusive of many other variations that do not depart from the broad interest and intent of the invention. It is, therefore, intended that all such modifications and substitutions be covered as they are embraced within the spirit and scope of the appended claims.

I claim as my invention:

1. The method of tilling soil to form small, parallel, flat topped terraces with lateral dams, comprising:
   a. slicing crop residue and soil with a plurality of coulter means in parallel, widely spaced slices as preparation for tilling soil;
   b. tilling parallel, widely spaced strips of soil with a plurality of narrow trench generating means and in line with selected slices as formed in Step a. and leaving a narrow open trench in the soil behind each said narrow trench generating means;
   c. tilling parallel, widely spaced, wide furrow strips in the soil with a plurality of furrow generating means so as to form ribbons of soil cut out from said furrow strips, which ribbons are deposited upside down on said narrow open trenches left in the soil by Step b., thereby generating small, parallel, flat topped terraces; and
   d. collecting loose soil from the wide furrow strips with a lateral dammer means, and depositing loose soil periodically so as to form substantially uniformly spaced barriers or lateral dams between said adjacent small, parallel terraces.

2. An apparatus for tilling soil adapted to generate a set of small, spaced, parallel, flat topped terraces with furrows therebetween having therein lateral dams during said tilling operation generally including a bridge-style frame means comprising:
   a. a bridge frame with a tongue to attach the apparatus to a prime mover at a hitch point for towing the apparatus;
   b. a support wheel for supporting the frame and controlling the height above ground level of said bridge frame means;
   c. a first cross frame means carried by said bridge frame, a plurality of coulter support frame means carried by said first cross frame means, a set of first, second and third coulters carried by each of said coulter support frame means, each coulter of said coulter set being laterally widely spaced to cut soil in a proper position for receiving a trailing tillage tool;
   d. a second cross frame carried by said bridge frame rearwardly of said first cross frame, a plurality of sets of ripper plow attachment frames carried by said second cross frame means, a set of ripper plow means carried by each of said second frame means, said ripper plow means being widely laterally spaced and located centrally and rearwardly of every third coulter;
   e. a third cross frame means carried by said bridge frame rearwardly of said second cross frame, a plurality of moldboard plow assembly means carried by said third cross frame means, each of said moldboard plow assembly means being widely laterally spaced, located centrally, closely flanked between, and rearwardly of said first and said second coulters said set of moldboard plow assembly means located rearwardly, alternate'd and centered between said forwardly located ripper plow means; and
   f. a fourth cross frame means carried by said bridge frame means rearwardly of the third cross frame, a plurality of lateral dam generator means carried by said fourth cross frame means, each said lateral dam generator means located rearwardly and centered behind each said moldboard plow assembly means.

3. An apparatus as in claim 2, wherein the third cross frame means carried by said bridge frame means is pivotable, a set of right-hand moldboard plow assembly means and a set of left-hand moldboard plow assembly means centered one above the other carried by said third pivoting cross frame means, said pivoting cross frame means is lowered and locked for said set of right-hand moldboard plow means assembly operation or raised, pivoted, lowered, and locked for said set of lefthand moldboard plow assembly means operation, each said right-hand moldboard plow assembly means and said left-hand moldboard plow assembly means being widely laterally spaced located centered, closely flanked between, and rearwardly of said first and said second coulter means of a respective coulter set, said set of right-hand moldboard plow assembly means and said set of left-hand moldboard plow assembly means located rearwardly, alternated and laterally centered between said forwardly located ripper plow means, and lock means interconnected between said support wheel means, and said third pivoting cross frame means for locking said third pivoting cross frame means against pivoting when said support wheel means is in the lowered position, and for unlocking said third pivoting cross frame means when said support wheel means is in the raised position.

* * * * *